United States Patent [19]

Schindler et al.

[11] 4,110,569
[45] Aug. 29, 1978

[54] METHOD AND APPARATUS FOR MONITORING THE ON/OFF-HOOK STATUS OF A TELEPHONE SET

[75] Inventors: Hans Rudolf Schindler, Langnau; Peter Vettiger, Thalwil, both of Switzerland

[73] Assignee: International Business Machines Corporation, Armonk, N.J.

[21] Appl. No.: 801,278

[22] Filed: May 27, 1977

[30] Foreign Application Priority Data

Jun. 25, 1976 [CH] Switzerland ............... 8144/76

[51] Int. Cl.² ........................... H04M 3/04
[52] U.S. Cl. ..................... 179/84 A; 179/18 HB
[58] Field of Search ............ 179/84 R, 84 A, 18 HB

[56] References Cited

U.S. PATENT DOCUMENTS 3,746,798  7/1973  Thomas ............... 179/18 HB
3,808,378  4/1974  Hernandez ............ 179/84 A

FOREIGN PATENT DOCUMENTS 526,893  8/1972  Switzerland.

Primary Examiner—Kathleen H. Claffy
Assistant Examiner—Joseph A. Popek
Attorney, Agent, or Firm—Edward H. Duffield

[57] ABSTRACT

In an extension line circuit, an off-hook condition is detected during ringing by superimposing in each ringing cycle the values of the line current existing at two sampling instants exactly one-half cycle apart, and testing whether the sum (or mean value) exceeds a given threshold. When DC current starts flowing due to the set going off-hook, the mean value of the two values will pass a threshold. The sample pulses for the sampling instants can be derived in common for all line circuits from positive-going zero crossings of the ringing supply signal.

7 Claims, 3 Drawing Figures

FIG. 1
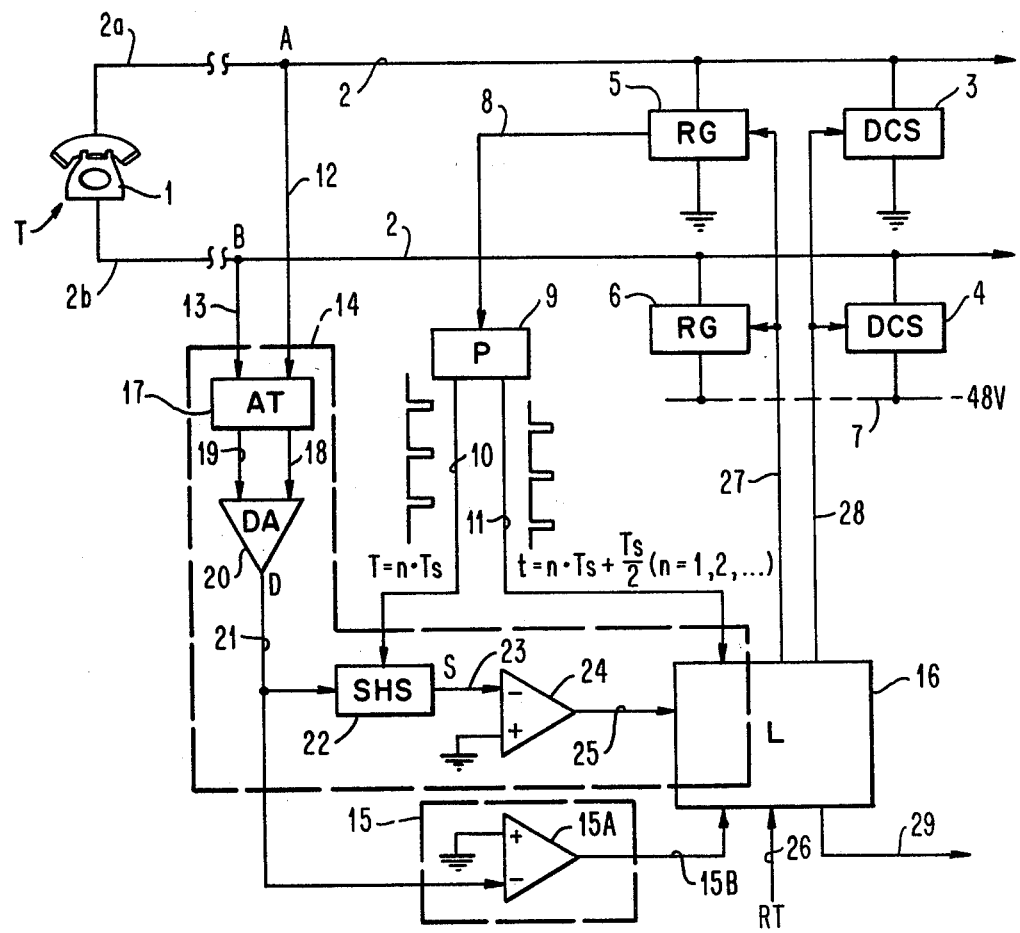
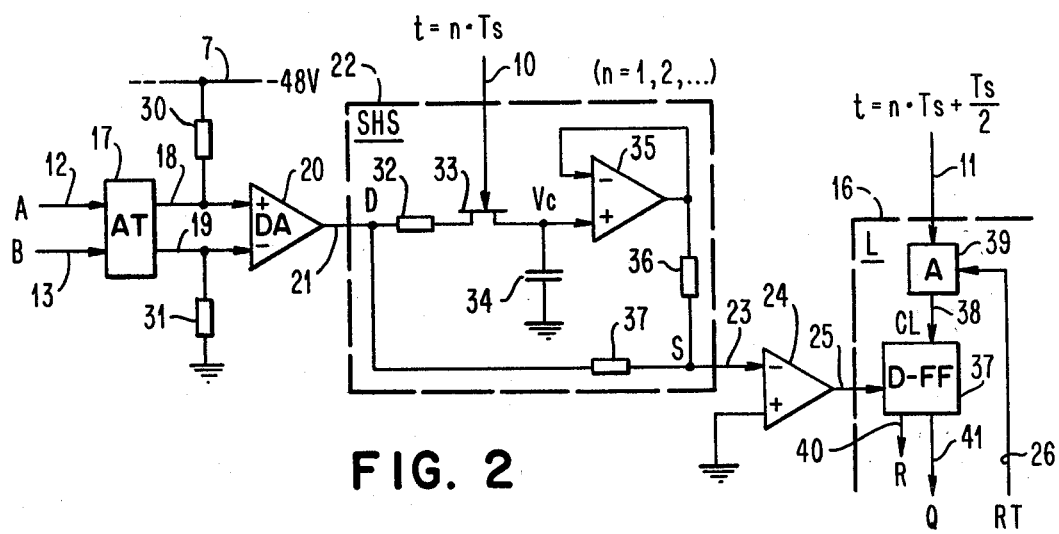
FIG. 2

METHOD AND APPARATUS FOR MONITORING THE ON/OFF-HOOK STATUS OF A TELEPHONE SET

The present invention relates to a method and apparatus for monitoring the ON/OFF-HOOK status of a telephone set connected to a telephone network during the time that a ring signal is applied to the set.

When establishing a talking circuit in a telephone network, a normal part of the operation is that a subscriber is called by a ring signal which is applied to the extension line to his telephone set. There is also a DC voltage always supplied to that extension line. However, in the quiescent ON-HOOK state, no direct current flows in the extension line as the DC path closes only when the set is taken OFF-HOOK and conversation starts. The switching means of the telephone exchange for the extension line provides for disconnecting the ring signal when the subscriber answers the call and, until lately, the switching means has been triggered by a device detecting the OFF-HOOK condition by monitoring the flow of DC in the respective extension line. Such arrangements have been described, for instance, in U.S. Pat. No. 3,746,798, issued July 17, 1973, to R. M. Thomas and in assignee's U.S. Pat. No. 3,808,378, issued Apr. 30, 1974, to P. N. Hernandez.

To indicate some of the problems to be faced in the development of a suitable DC detector, it must be considered that the AC current in the circuit, due to a ringing signal, may reach a comparatively high value. The situation will be even worse when the circuit is unbalanced, when the leakage resistance between the two wires of an extension line drops to as low as 20 K$\Omega$ or when interfering common mode voltages appear on the extension line. The criteria for monitoring the flow of DC in order to detect the ON/OFF-HOOk status of a subscriber's telephone cannot be defined in simple terms. Moreover, measures must be considered to eliminate the ill effects of the disturbing characteristics mentioned above. As a consequence, the monitoring and switching circuitry becomes rather complex and, hence, very expensive. Such expensive circuitry will not be economical when restricted to a low volume use.

In Swiss Pat. No. 526,893, an arrangement is shown for comparing the current flowing in the extension line, which current may comprise an AC as well as a DC component, to a threshold value. The times are measured during which that current is respectively higher and lower than the threshold value. The comparison of those times permits the detection of a shift in the DC value. However, a precision clock generator is needed to allow accurate pulse counting for timing. To some degree, this method is also dependent on the frequency and amplitude of the ring signal.

It is an object of the present invention to disclose a completely new method for reliably monitoring the ON/OFF-HOOK status of a telephone set under unfavorable conditions. The method is characterized by sampling AC voltages proportional to the instantaneous voltage of the ring signal during any period at each of two times half a cycle apart, by testing whether the algebraic sum of the voltage sample and an earlier sampled value is below a predetermined threshold value and, when the latter is true, by delivering a signal indicative of the OFF-HOOK status detected.

A circuit arrangement operating in accordance with said method is characterized by a first circuit means for producing a first voltage proportional to the voltage present at the input of said telephone set, by a pulse generator producing two sample pulses per cycle of the ring voltage, which pulses are separated in time by half a period, and finally by a second circuit means connected to said first circuit means and to the pulse generator for the purpose of performing the sampling, for summing the first voltage and the last sampled value, for comparing that sum with a threshold value and for delivering a signal indicating the status detected.

In the following, the method of the invention and a preferred embodiment using the method will be described in all details and illustrated with the aid of the appended drawings:

FIG. 1 shows a block diagram of an extension line circuit having a detector operating in accordance with the invention for detecting the status of the telephone set while the ring signal is applied to that extension;

FIG. 2 shows the basic diagram of said status detector; and

Figure 3:
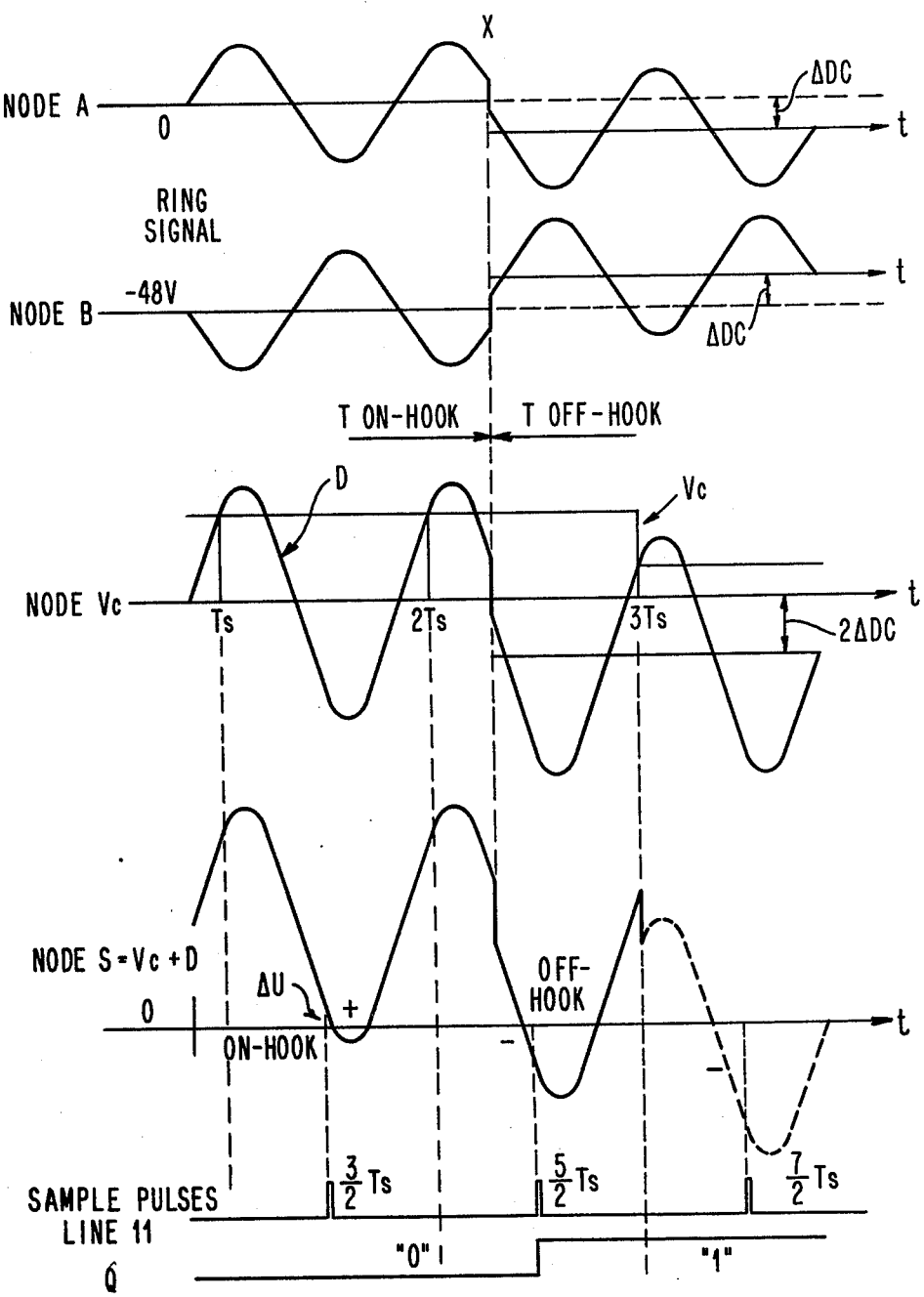
FIG. 3 shows graphs of the signal voltages existing at specified nodes of the detector circuit.

The extension line circuit of FIG. 1 represents an interface between the wires connected to a subscriber's telephone set and the switching exchange of a local telephone network. Its main use is to provide the following functions: detection of the ON/OFF-HOOK status of a subscriber's telephone set as well as signalling detection, application of the ring signal to the extension line and powering of the telephone set with DC.

The telephone set 1 of a subscriber is connected to the end of an extension line 2, comprising a 2a and a 2b wire. That line starts at the exchange of the switching part of the network which is not shown. Two equivalent controllable DC supply circuits (DCS) 3, 4 are attached, one to each wire $a$ or $b$ of line 2, and are arranged in a way to maintain the signal balance for AC. The second terminal of supply circuit 3 is grounded, while the second terminal of supply circuit 4 is connected to a potential of $-48$ volts, supplied, for example, by a battery or generator not shown, the positive terminal of which is grounded. The extension line circuit 2 also comprises a balanced ring generator circuit (RG) arranged in two sections 5, 6. This generator is switched in or out of the circuit when needed alternately with the DCS's 3 and 4 whereby section 5 is connected between wire 2a and ground, and section 6 is connected between wire 2b and DC supply bus 7 bearing the potential of $-48$ volts.

Ring generator section 5 also delivers its AC ring voltage via output line 8 to a pulse generator (P) 9 which derives two sequences of pulses from the zero crossings of said AC voltage. The intervals between pulses of each of these sequences correspond precisely to the frequency fr of the ring signal, which means that their period $Ts = 1/fr$. One pulse sequence is shifted relative to the other by exactly $\pi(180°)$ of the ring signal frequency. The pulses, which are short in comparison to Ts, appear on the one generator output line 10 at the times $t = n \cdot Ts$, where $n$ is an integer equal to or greater than 1, and the pulses on the other output line 11 appear at the times $t = n \cdot Ts + Ts/2$. As will be explained later, the two pulse sequences are used in an ON/OFF-HOOK status detector during the presence of the ring signal at a subscriber's telephone set.

Sensing lines 12 and 13 are connected to the 2a and 2b wires at points A or B, respectively, of the extension line 2. They feed an ON/OFF-HOOK status detector 14 operating while the ring signal is present and detector 14 feeds a second detector 15 which responds to other subscriber signals. The status detector 14 is the subject of this invention and is shown in FIG. 2 in more detail. Detector 15 responds, for instance, to OFF-HOOK voltage changes when the DCS's are connected and to dial signalling pulses. This type of detector is conventional in the art and operates reliably when no ring signal is present and has been mentioned here only for completeness. It may comprise a simple comparing circuit such as 15A, the output signals of which are transferred over a line 15B to an extension logic circuit (L) 16 for further processing.

The status detector 14 of FIG. 1 comprises first an attenuator (AT) 17 which reduces the voltages appearing on lines 12 and 13 by a substantial ratio, for example, 30 to 1, translates the attenuated voltages to a common DC level, near 0 volts, and transfers these reduced and DC voltage translated signals to a difference amplifier (DA) 20 via lines 18 and 19. The output signal of said DA amplifier 20 appears on line 21 feeding simultaneously said second signalling detector 15 and a sample-hold- and summing circuit (SHS) 22. Output line 23 of said SHS circuit 22 is connected to the inverting input of a comparing circuit 24. The other input of that circuit 24 is grounded, as shown in FIG. 1. The output signal generated by comparing circuit 24 and appearing on connecting line 25 is now transferred to the extension logic (L) 16 already mentioned.

The sample-hold- and summing circuit 22 as well as the extension logic 16 need sample pulses having an interval of Ts to fulfill their respective functions. The pulse sequence on said line 10 is fed to sampling circuit 22 and the sequence on line 11 to logic circuit 16. This logic circuit 16 is also provided with a ring trigger signal over input line 26 to signal when a ringing signal is to be sent to extension line 2. Moreover, to be able to follow the command of a ring trigger signal there is a control line 27 connecting the logic circuit 16 with both sections 5, 6 of the ring generator to apply the ring signal. Another control line 28 of the logic circuit 16 is connected to both DC supply circuits 3, 4 in order to control and adjust the DC energization of extension line 2 and telephone set 1 during non-ringing times. Finally, there is an output line 29 from logic circuit 16 to the exchange, not shown, of the local telephone network. The signals on that output line, when scanned by the exchange, provide the required information on status of and signalling on extension line 2.

The diagram of FIG. 2 shows further details of the ON/OFF-HOOK status detector 14 in accordance with the present invention. To each of the connecting lines 18, 19 between attenuator 17 and difference amplifier 20, one resistor 30 or 31, respectively, is attached. To maintain the AC balance, both resistors are equal. However, the other terminal of resistor 30 is connected to supply bus 7 which bears the potential of −48 volts, while the counterpart resistor 30 has its second terminal grounded. The purpose of resistors 30 and 31 is to shift the quiescent DC input level of difference amplifier 30 slightly off center. The significance of this shift will be explained later.

The output signals are transferred from difference amplifier 20 over line 21 to the sampling-hold- and summing circuit (SHS) 22 which has two signal paths between input node D and output node S. The upper path comprises resistor 32 for limiting current peaks and connected in series with a sampling gate 33 which may consist of a field-effect transistor having a control electrode. The control input of the sampling gate 33 is connected to output line 10 of pulse generator 9, FIG. 1, and, therefore, receives the sequence of the pulses appearing at the time $t = n\cdot Ts$, whereby n is a positive integer. At the output of sampling gate 33, the signal samples are applied to one terminal of a capacitor 34, the other terminal of which is grounded. The signal terminal of capacitor 34 is also connected to the input of a buffer stage 35 which may be an amplifier with high negative feedback. The purpose of buffer stage 35 is to isolate capacitor 34 from the succeeding elements which could cause a loss of the charge stored by it thereby changing the signal sample. The output of the buffer stage 35 is connected to one end of a resistor 36 which is part of a resistive summing network. The summing network also includes resistor 37 which represents the lower signal path of the sample-hold- and summing circuit 22 and has one end connected to node D. The other ends of resistors 36 and 37 are connected together and comprise node S. The values of these resistors 36 and 37 are equal.

From node S an output line 23 of the SHS circuit 22 just described is connected to an inverting terminal of a comparing circuit 24, the output signals of which reach an input of the extension logic circuit 16 via connection 25. In FIG. 2, only a part of the logic circuit 16 is shown, i.e., that part which is needed for an understanding of the operation of the ON/OFF-HOOK detector 14. The connection 25 transmits the signals from comparator 24 to the data input of a data flip-flop (D-FF) circuit 37. There is a second input 38 to flip-flop 37 which receives a clock signal through an AND-gate 39. When the data signal on lead 29 is a logic "1" at the time a clock pulse appears on line 38, then the flip-flop circuit 37 switches from a reset state to a set state. When the clock pulse disappears, the flip-flop circuit 37 does not return to the reset state but stays where it was set until it is reset by a signal at input 40. At the output terminal 41 of the data flip-flop 37, a signal will show, at any time, the status of flip-flop 37 for further use in the logic. The AND-gate 39 has two inputs, one of them being the output line 11 of pulse generator 9 and the other one being the input line 26 which brings the ring trigger signal into logic circuit 16.

The following section describes the voltages present during operation of the ON/OFF-HOOK status detector 2. For better understanding, the most important signals are depicted in FIG. 3 as they may appear at some nodes of the circuit. Approximately in the middle of the depicted signals at X, a sudden change of the signals is clearly visible. This represents the time when the called subscriber takes the hand set from the hook of the telephone apparatus 1. Before this time, i.e., at the left of the dashed line, the hand set is ON the hook; after this time or at the right of said line, the hand set is OFF the hook.

When a ring signal is to be applied to the extension line 2, a ring trigger signal RT is applied to the input line 26 of the extension line circuit of FIG. 1. This latter signal in the conventional manner causes the logic circuit 16 to switch off both sections of DCS's 3 and 4 via control line 28 and to switch on both sections 5, 6 of the ring generator via control line 27 and, therefore, at the points A and B of extension 2 the situation is as follows:

The 2a and 2b wires bear equal AC ring voltages of opposite polarity and are connected through RG's 5 and 6 to ground and −48 volts, respectively, whereby the 2a wire is at a zero RMS potential and the 2b wire is at −48 volts RMS. The hand set of telephone 1 is still ON the hook and, therefore, there is no DC flow through extension line 2. Simultaneously, the AC ring voltage from section 5 reaches pulse generator 9 via line 8 to activate generator 9, as already mentioned, to produce two pulse sequences to be fed on lines 10 and 11 to the ON/OFF-HOOK detector 14.

The two upper lines of FIG. 3 illustrate the voltages at the points A and B, respectively, of extension line 2. The third line shows the voltage values at the output node D of difference amplifier 20 and, in lighter lines, the voltage Vc, which is the node D voltages as sampled and stored at times $n \cdot Ts$. Voltage Vc is measured at the terminal of capacitor 34 in the sample-hold- and summing circuit 22. At output node S of said circuit arrangement there appears the summed voltage $S = Vc + D$ which is shown in FIG. 3 on the fourth line. Remembering that voltage Vc is obtained by sampling the AC voltage of node D at the time $n \cdot Ts$, it can be seen that when the same sinusoidal voltage is considered again, one half cycle later at the time $(n \cdot Ts + Ts/2)$, it will be equal in magnitude and opposite in sign to the sampled voltage Vc. Now, when this instantaneous voltage value is algebraically added to the value of Vc, the sum is zero. This result is independent of the exact time in the AC cycle at which sampling occurs. However, it is essential that the sampling times differ by exactly 180° of the AC cycle.

The voltage sum $S = Vc + D$ at the time $3/2 \cdot Ts$ should, theoretically, be equal to zero. But, referring back to FIG. 2, it will be seen that between attenuator 17 and the input terminals of the difference amplifier, two resistors 30, 31 are inserted which in conjunction with attenuator 17 will, as noted above, shift the operating point of the amplifier input a little way from the DC potential for a null-output. The positive amplifier input terminal 18 will be shifted to a small negative voltage but input 19 will be shifted slightly more negative and this results in a low positive DC voltage level on output line 21. This DC voltage is also the origin of the low positive voltage $\Delta U$ shown at the time $3/2 \cdot Ts$ of the signal $S = Vc + D$ presented in FIG. 3. The summing signal 8 is transferred via line 23 to comparing circuit 24 which, for instance, may be embodied by a difference amplifier having high amplification and producing an output signal of reversed phase at its terminal 25. So long as the voltage of node S is positive at the inverting amplifier input, the output level on line 25 is at or below zero. This level becomes positive as soon as S drops below the zero reference voltage on the other input of comparator 24. A positive level of line 25 appears as a binary "1" data signal to the data flip-flop circuit 37 which is thereby set when a clock signal CL is applied to its second input 38. At the time $3/2 \cdot Ts$, the signal level of data line 25 is still at or below zero and, therefore, no setting of data flip-flop 37 occurred. Its output terminal 41 carrying the signal Q, see the last line of FIG. 3, is at zero logic level.

The situation described so far is true for the time during which the ring signal is present at the subscriber's telephone 1 and while its hand set is still ON the hook, the latter condition preventing DC flow in extension 2. At some later time, such as X, the hand set is taken off the hook of the telephone apparatus when the subscriber answers the call. At this time there is no change regarding the AC voltages in points A and B as compared to the earlier time. However, due to IR drops in the RG's 5 and 6 voltage levels have been shifted unmistakably; point A has dropped from zero to a negative value and point B has risen from −48 volts to a value which is less negative as indicated at the A and B charts of FIG. 3. The voltage difference between A and B has dropped because the DC voltage difference between A and B is now less than 48 volts but B remains more negative than A. The AC voltage D appearing as an output of difference amplifier 20 on line 21 maintains the same peak-to-peak voltages as before but the average or DC level of the amplifier output terminal has become more negative. From the third line of FIG. 3, it can be seen that the sinusoidal voltage D drops suddenly to a more negative DC level by an amount $2\Delta DC$ at the time the telephone hand set is taken OFF the hook but continues the same AC signal about that new DC level, after that step.

The situation is different for the sampled and stored voltage Vc on capacitor 34. The last sampling occurred at the time $2 \cdot Ts$, see the third line of FIG. 3, and the corresponding voltage is stored in capacitor 34 and is held unchanged up to the next sampling time at $3 \cdot Ts$. At time $3 \cdot Ts$, there is an abrupt drop of voltage Vc to a lower level as compared to the values sampled before the hand set is taken OFF the hook. The signal S, shown in the fourth line of FIG. 3, undergoes, at the time X, a voltage drop due to the new DC level of the D signal whereby the minimum values of the summed voltages clearly penetrate the negative domain.

At the time $3 \cdot Ts$, there is a further step down in voltages as the voltage Vc also changes to a lower value. Consequently, wide positive data signals appear at the output of comparing circuit 24 from which they are transferred to the input of the data flip-flop circuit 27. At the time $5/2 \cdot Ts$, a sample pulse from line 11 reaches clock input 38 through gate 39 and the leading edge of this pulse immediately sets flip-flop circuit 37 to its opposite state causing a high level or logic "1" signal to appear on the Q output line 41. That Q signal shows that the status of the subscriber's extension has changed while the ring signal was being applied to this line.

Thus the ON/OFF-HOOK detector 14, unambiguously determines in an interval of one ring signal period that a subscriber who was called has taken the telephone hand set OFF the hook. The corresponding Q signal will first be used to immediately switch off the ring signal generators 5 and 6 over line 27 and to switch on DCS's 3 and 4 over line 28 and then for reporting to the switching exchange and for other purposes.

Practical tests of the circuit arrangement just described have shown that the ON/OFF-HOOK status detector operates very reliably without being dependent on the impedance and frequency of the ring generator. The ON/OFF-HOOK detection occurs with such a wide margin of tolerance that faulty decisions are actually excluded. This is due to the comparison of sum signal S with a threshold value $\Delta U$ which is small but not equal to zero and which can be adjusted as desired simply by shifting the DC levels of the inputs of amplifier 20 by means of resistors 30 and 31.

The difference amplifier 20 following attenuator 17 prevents interference with the decision function by common mode signals on the extension line. Even nonlinear behavior of the DC supply due to an appearance of common mode voltages on the extension line cannot impede the operation of the detector according to the present invention. The simple circuit arrangement is advantageous in that it comprises only two sense lines, that uncritical elements such as resistors with an accuracy of 1% at the most are satisfactory and that two-state difference amplifiers will serve as comparison circuits.

The above description of a preferred embodiment of the invention is not to be taken as limiting the scope of the invention as many modifications of structure are possible without departure from the inventive concept.

What is claimed is:

1. A method for signalling the ON/OFF-HOOK status of a telephone set connected by a pair of extension wires to a telephone system during the time an AC ringing signal and a DC operating voltage are applied from sources thereof to the extension wires of said telephone set, said method comprising the steps of:

generating an AC signal having an instantaneous magnitude proportional to the difference between the instantaneous magnitude of the voltage on one of said extension wires with reference to one pole of said source of said DC operating voltage and the instantaneous magnitude of the voltage on the other of said extension wires with reference to said other pole of the source of said DC operating voltage;

using said ringing signal to control generation of a sequence of equidistantly spaced pulses at a frequency twice that of said ringing signal;

using alternative ones of said pulses to control a sampling of said generated AC signal;

storing said samples of said generated AC signal during the interval between the taking of said samples;

summing said stored sample with said generated AC signal to generate a sum signal;

comparing said sum signal with a reference value;

changing the magnitude of the DC voltage between said pair of extension wires when said telephone set goes OFF-HOOK; and providing an OFF-HOOK detection signal if said sum signal exceeds said reference value at the time of occurrence of one of the remaining ones of said pulses.

2. A method as set out in claim 1 further including the step of biasing said generated AC signal with a small DC offset to similarly bias said sum signal whereby said sum signal will be clearly distinguishable from said reference signal at the time of occurrence of one of the remaining ones of said pulses.

3. A circuit for the detection of the ON/OFF-HOOK status of a telephone set connected by a pair of extension wires to a telephone system, said system being operative during the time that an AC ringing signal and a DC operating voltage are applied from sources thereof to said pair of extension wires and comprising:

a signal generator coupled to said extension wires to produce a signal proportional to the difference between the instantaneous voltage on one of said wires with reference to the particular pole of said DC operating voltage source connected to said one wire and the instantaneous voltage on the other of said extension wires with reference to the other pole of said DC operating voltage source connected to said other wire;

means controlled by said ringing signal to generate a sequence of equally spaced pulses having a frequency twice that of said ringing signal;

a voltage storing circuit;

sampling means between said signal generator and said voltage storing circuit, said sampling means controlled by alternate ones of said sequence of pulses to store samples of said signal generator produced signal;

summing means to add the voltage of said stored signal to that signal produced by said signal generator;

means between said source of said DC operating voltage and said extension wires to change the DC voltage difference between said extension wires when said telephone set goes OFF-HOOK; and an OFF-HOOK status detector settable to indicate an OFF-HOOK status when the output of said summing means differs from a reference value at the time of occurrence of one of the remaining ones of said sequence of pulses.

4. A status detector circuit as set out in claim 3 wherein said signal generator includes:

an attenuator receiving the signals on said extension lines; and a difference amplifier connected to receive signals from said attenuator whereby common mode signals on said extension wires are suppressed.

5. A status detector circuit as set out in claim 4 and further characterized in that said circuit includes:

resistance elements connected between the outputs of said attenuator circuit and the poles of said source of DC operating voltage to offset from zero the average voltage level of said difference amplifier when the telephone set is ON-HOOK.

6. A status detector circuit as set out in claim 4, further characterized in that said pulse generating means controlled by said ringing signal includes:

a pair of output lines, one line for said alternate ones of said sequence of pulses and the other line for the remaining ones of said sequence; and pulse producing means to generate a pulse on said one line in response to each positive-going zero voltage crossing of said ringing signal and to generate a pulse on said other line in response to each negative-going zero voltage crossing of said ringing signal.

7. A status detecting circuit as set out in claim 4 and further characterized in that said status detector includes:

a bistable device to generate said OFF-HOOK status indicating signal;

a connection between said bistable device and summing means to supply said summed voltage to said bistable device; and a gate controlled by said remaining ones of said sequence of pulses to allow said bistable device to be set if said summed voltage is, at that time, substantially different from a reference voltage.

* * * * *